United States Patent [19]

Lucier et al.

[11] Patent Number: 5,373,630
[45] Date of Patent: Dec. 20, 1994

[54] CYLINDER CONVERSION FABRICATION OF CRANKCASES FOR TWO-CYCLE V-TYPE LOCOMOTIVE DIESEL ENGINES

[75] Inventors: Gregory T. Lucier, Boise; Edward C. Allen, Kuna, both of Id.

[73] Assignee: MK Rail Corporation, Boise, Id.

[21] Appl. No.: 165,414

[22] Filed: Dec. 13, 1993

[51] Int. Cl.$^5$ .............................................. B23P 15/00
[52] U.S. Cl. .............................. 29/888.011; 29/888.01; 29/402.03
[58] Field of Search ............... 29/888.011, 888, 888.01, 29/402.03, 402.19

[56] References Cited

U.S. PATENT DOCUMENTS

| | | | |
|---|---|---|---|
| 4,862,865 | 9/1989 | Dahlen et al. | 123/669 |
| 5,222,295 | 6/1993 | Dorris, Jr. | 29/888.011 |

FOREIGN PATENT DOCUMENTS

| | | | |
|---|---|---|---|
| 2680993 | 3/1993 | France | 29/888.011 |
| 1701463 | 12/1991 | U.S.S.R. | 29/888.011 |

*Primary Examiner*—Irene Cuda
*Attorney, Agent, or Firm*—Raymond N. Baker

[57] ABSTRACT

Longitudinal end portions of an elongated twenty-cylinder engine are disassembled to remove a cylinder location from each end of each cylinder bank for converting a crankcase from a twenty-cylinder, two-cycle, V-type diesel engine to a sixteen-cylinder configuration for use in a diesel electric locomotive. Peripheral air box access windows are provided at each longitudinal end of the crankcase. Portions of the exhaust deck, water jacket side wall and internal cylinder retainer support framing from the disassembled end portions are return welded to the remaining structure after separation of each endplate. Distal edges of longitudinally-extending remaining crankcase framework are machined to provide for receiving a new planar endplate of increased thickness gage at each end. Vibration and thermal stress-relief are applied before external surfaces of the new endplates are machined. The power deck for each cylinder bank is machined uniformly to relocate each camshaft with uniform downward displacement; the crankshaft relationship is predetermined accordingly, and openings for endplate support drive openings maintain their same angular and dimensional relationships to the camshafts and crankshaft.

9 Claims, 11 Drawing Sheets

CYLINDER CONVERSION FABRICATION OF CRANKCASES FOR TWO-CYCLE V-TYPE LOCOMOTIVE DIESEL ENGINES

This invention relates to refabrication of locomotive diesel engine crankcases and, more particularly, is concerned with converting crankcase structure of a two-cycle V-type diesel engine from twenty-cylinder configuration to sixteen in a manner providing for relocation of camshafts and crankshaft, providing for proper orientation and coacting relationships of standard motive drive components for a sixteen-cylinder two-cycle V-type diesel engine and enabling standard mounting of the converted crankcase for use in a diesel electric locomotive.

Two-cycle diesel engines with a pair of V-oriented cylinder banks have been relied on as power sources since the start of diesel electric locomotive manufacture in the U.S.A. Development of a six hundred forty-five cubic inch cylinder engine series, prior to the mid-1960's, helped to establish a record of operational reliability for that type of engine. And diesel engines of that series, with cylinders equally divided between two cylinder banks oriented at forty-five degrees, including numerous twenty and sixteen-cylinder locomotive diesel engines, were built. Production by the original manufacturer of diesel electric locomotives using the six hundred forty-five cubic inch cylinder engine series extended for more than twenty years, but was discontinued in the 1980's.

Analyzing engine characteristics, such as the overall length of the engine, coordinating operation of drive components and their dimensional requirements, fuel distribution, heat removal, traction horsepower and the like, indicates advantages in accordance with present teachings, for a sixteen-cylinder configuration two-cycle V-type diesel engine for locomotive use and a preference for a traction horsepower rating of about three thousand to thirty-three hundred horsepower. For example, such diesel electric locomotives can be optimally operated in a wide range of single unit uses and are readily adapted to multiple unit operations.

Present teachings are directed to enabling conversion of a crankcase for a two-cycle twenty-cylinder V-type diesel engine for reliable use in a sixteen-cylinder engine configuration. As part of the crankcase conversion concepts of the invention, novel fabricating/machining procedures are carried out in-place on the crankcase by providing new preselected thickness gage endplates which maintain an overall sixteen-cylinder crankcase length within tolerance specifications for use in a diesel electric locomotive. Further, the invention enables use of dimensionally standard motive-power components for sixteen-cylinder diesel engines of the two-cycle V-type series in the converted crankcase notwithstanding modification of crankshaft and camshaft locations.

Other advantages, procedures and contributions of the invention are set forth in more detail in describing a specific embodiment of the invention with references to the accompanying drawings, in which:

Contributions of the invention enable conversion of a twenty-cylinder crankcase for an elongated V-type diesel engine to a sixteen-cylinder crankcase configuration, for reliable use as part of a two-cycle V-type sixteen-cylinder engine for a diesel electric locomotive, in which cylinder locations are symmetrically distributed in each cylinder bank in relation to a longitudinal central portion of the crankcase.

In preparing an engine for conversion, top deck head frames and covers are removed, along with handhole covers, from a twenty-cylinder engine block. Also, all motive-drive-related components are removed, such as camshafts camshaft support brackets and camshaft towers, crankshaft retainer caps and crankshaft, cylinder test-valves, cylinder liners and associated power assemblies, drive gear assemblies, and engine-mounted air, lube and coolant water pressurizing means and associated support brackets. The resulting static crankcase structure, if mounted on a supporting oil pan, is removed from the oil pan; and, preferably, is cleaned prior to start of conversion cutting, machining and refabrication. Further details on the motive components of the specific embodiment can be obtained from the 645 E3 *Turbocharged Engine Maintenance Manual*, 8th Ed. (1983), a Service Department publication of the Electro-Motive Division of General Motors, La Grange, Ill. 60525; in particular, pages 2-19, 21; 3-2, 8, 13-16; and 4-1, 3 which are incorporated herein by reference.

Structural framework members of a twenty-cylinder block, which are to be part of the sixteen-cylinder configuration, are evaluated for adequacy, such as: the exhaust deck between the V-oriented banks, and the power deck surfaces of the left and right V-oriented cylinder banks. That is, portions of the twenty-cylinder exhaust deck, such as the water outlet and the aftercooler water discharge opening (as shown by the hatching of FIGS. 1, 2), are relocated and reused in the converted sixteen-cylinder crankcase; those and other remaining exhaust deck portions are required to meet exhaust deck specifications set forth later.

Figure 3:
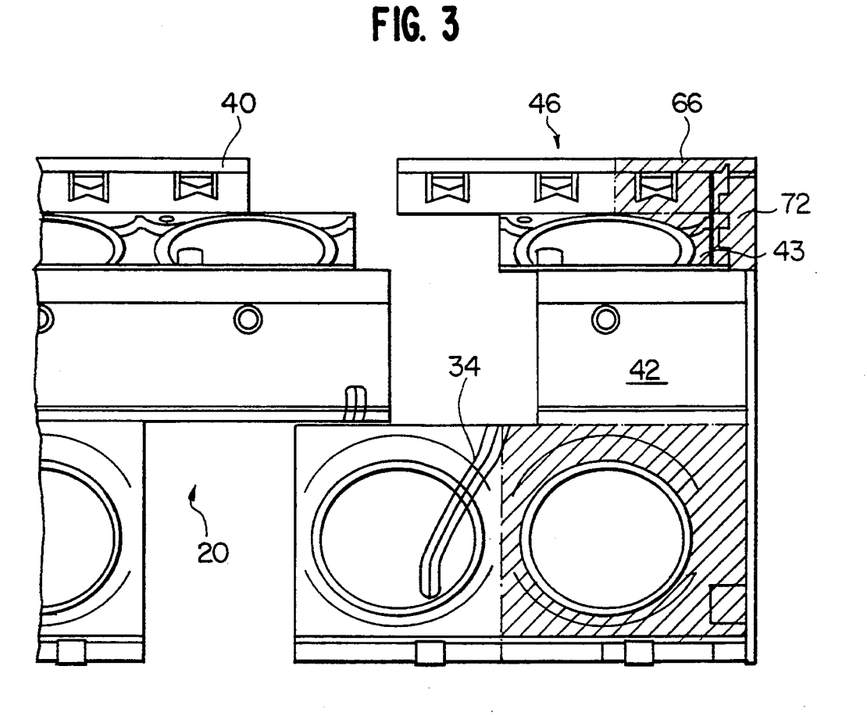
FIG. 3 is a schematic disassembly side view of the twenty-cylinder crankcase of FIG. 1 for describing cutting separation of framework portions and removal of air box access windows for each bank, with selected portions for return assembly shown hatched.
Figure 4:
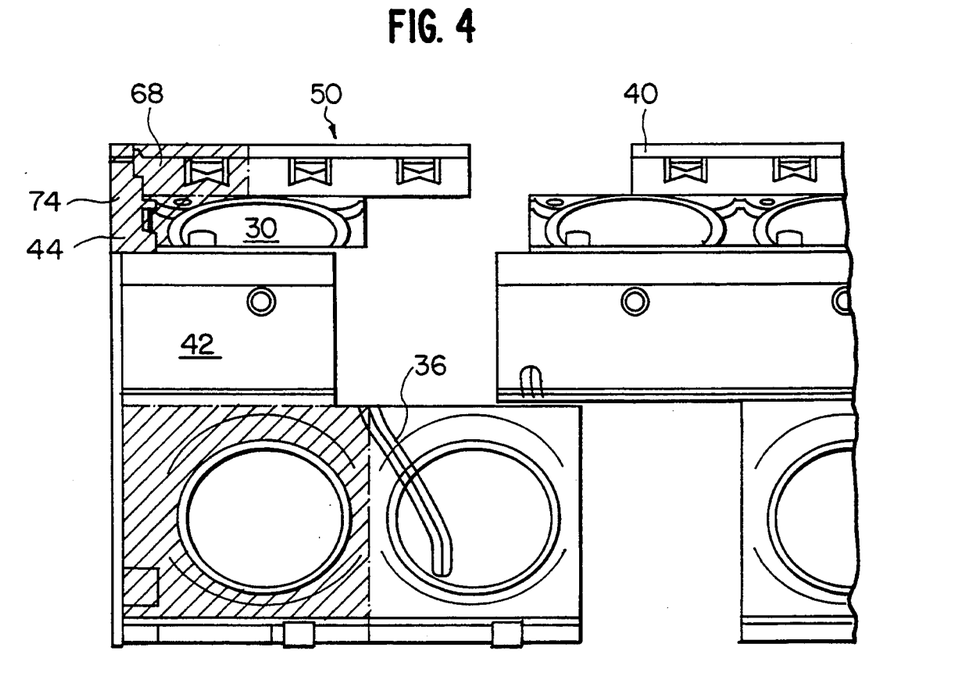
FIG. 4 is a schematic disassembly side view of the twenty-cylinder crankcase of FIG. 2 for describing cutting separation of framework portions, and removal of air box access windows on each bank, with selected portions for return assembly shown hatched.
Figure 5:
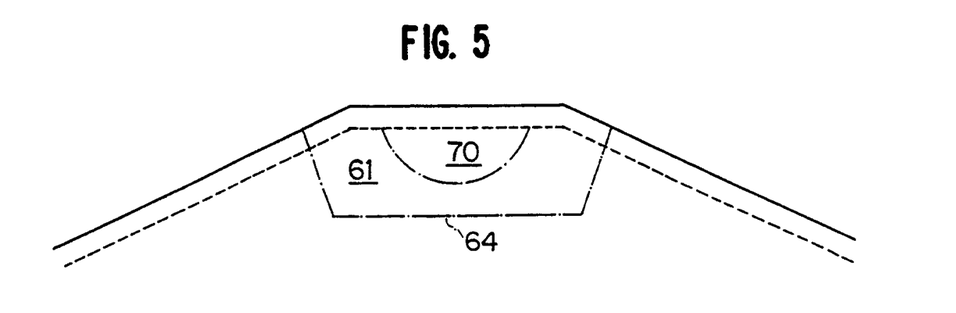
FIG. 5 is an end view in elevation of a selected endplate portion to be separated from the remaining endplate, in accordance with present teachings, to provide access for cutting framework members adjacent to a half-round flow-diffuser plate of the water discharge manifold.

Access windows are severed from the peripheral surface of each air box at each longitudinal end of the crankcase. Air box handhole openings are equally distributed on each side, symmetrically to such longitudinal central portions similar to the cylinder locations. As shown in FIGS. 3, 4, the equivalent of two cylinder locations on each air box side wall is removed from each longitudinal end of the crankcase. A side wall portion of the type to be later returned on each side is indicated by hatching in FIGS. 3, 4.

Figure 1:
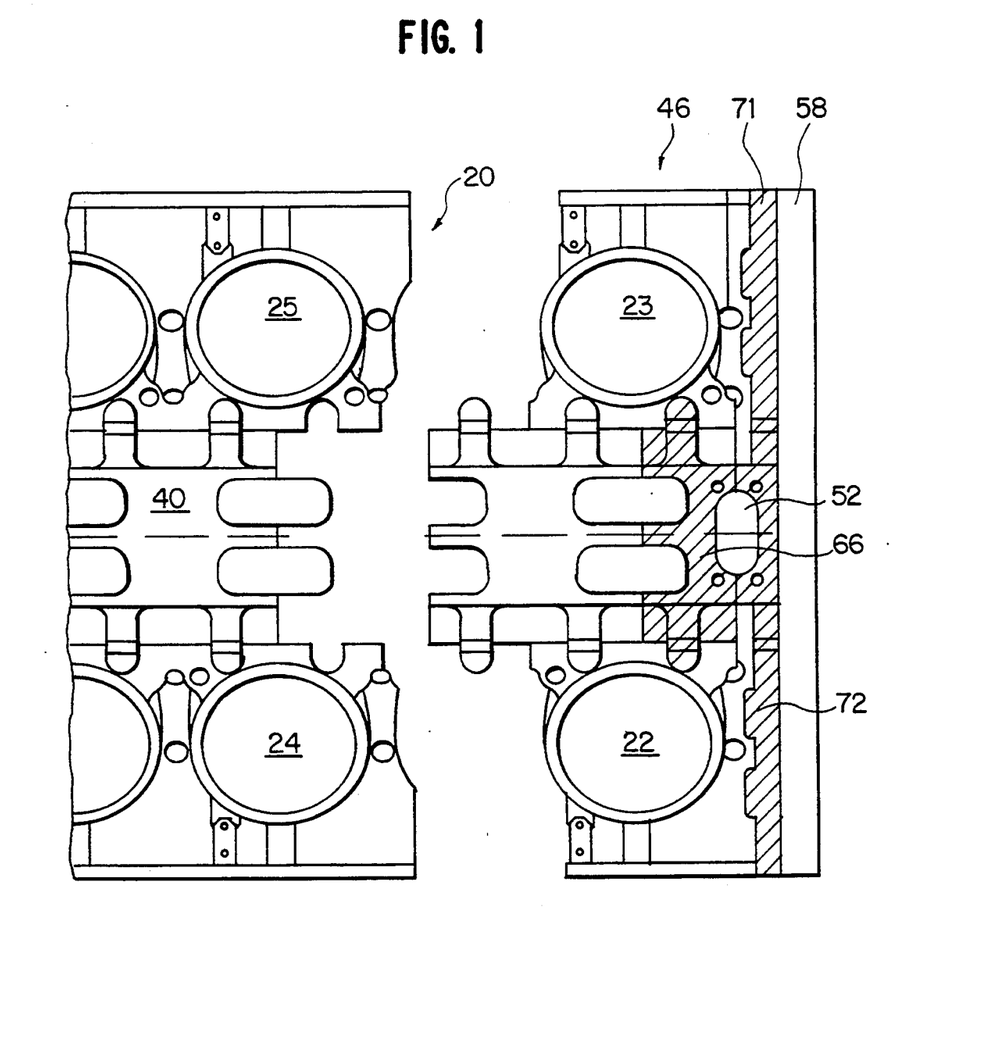
FIG. 1 is a schematic disassembly plan view of a portion of the accessory-drive end of an elongated twenty-cylinder crankcase for a two-cycle V-type diesel locomotive engine, for use in describing procedures for separation of a single cylinder location from each cylinder bank, in accordance with the invention; and for describing return placement of selected next adjacent contiguous portions (shown hatched) during reassembly of a sixteen-cylinder crankcase.
Figure 2:
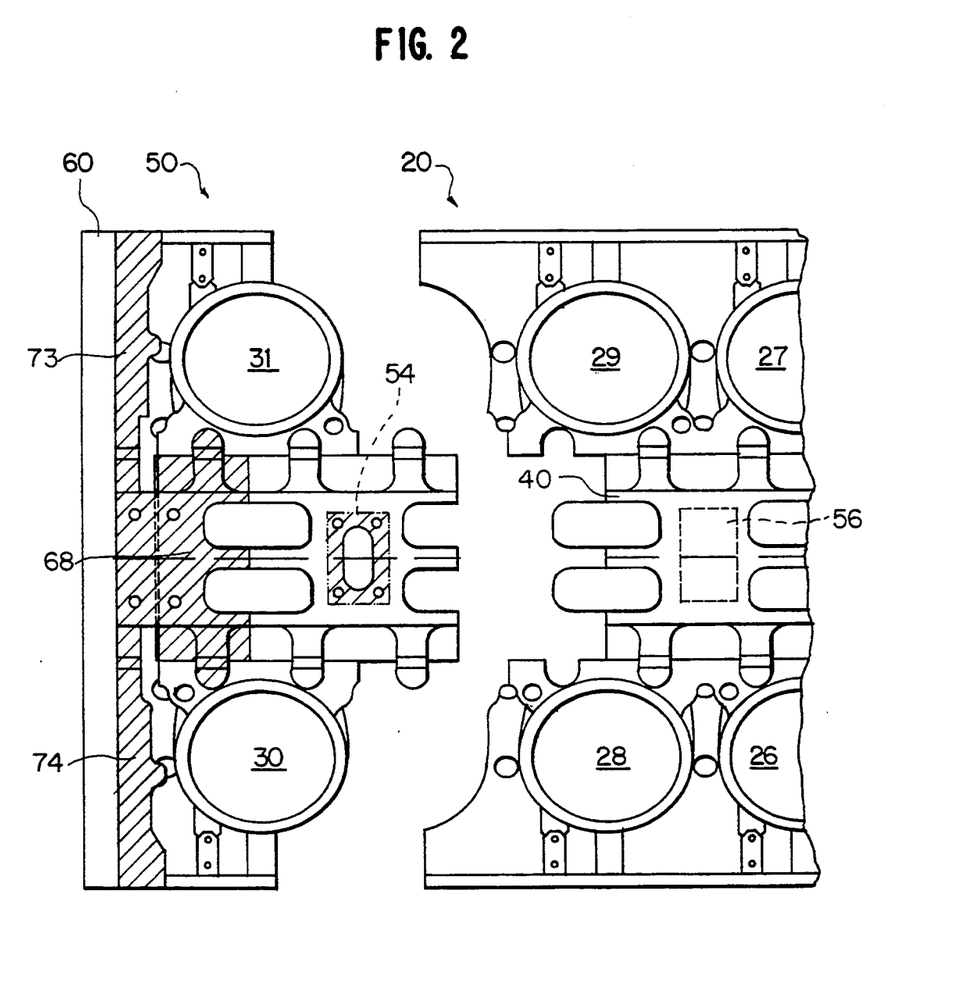
FIG. 2 is a schematic disassembly plan view at the main-drive end of an elongated twenty-cylinder crankcase of FIG. 1 for use in describing procedures for separation of a single cylinder location from each cylinder bank at that end of the crankcase, and for return placement of selected portions of next adjacent cylinder locations (shown hatched) during reassembly.

The schematic views of FIGS. 1 through 4 show portions of twenty-cylinder crankcase 20 after removal of all engine-mounted air, lube and coolant water pressurizing means, associated support brackets, and all drive-related components. FIGS. 1 and 3 show disassembly of a portion of the accessory drive end of the twenty-cylinder crankcase, and FIGS. 2 and 4 show disassembly of a portion at its main-drive end.

The crankcase conversion process of this invention involves removing a cylinder location from each cylinder bank at each longitudinal end of the crankcase. A teaching which makes such removal of cylinder locations and restoration of certain remaining crankcase structure practical involves replacing each endplate with a heavier-gage preselected thickness planar endplate. Other novel concepts of the invention involve: providing access for separation of original endplate portions and cylinder locations at each end of the elongated twenty-cylinder crankcase, replacement and restoration of selected portions of disassembled exhaust deck and other framework portions at each end, and procedures for relocation of camshafts and crankshaft.

The top plan view, at the accessory-drive end of crankcase 20 (FIG. 1), shows disassembly of crankcase structure associated with cylinder retention means 22, 23, and portions associated with next adjacent cylinder retention means 24, 25. Reference number 22 is the location for engine cylinder number one which is located in the right bank at the front end of the twenty-cylinder crankcase being converted.

FIG. 2 shows disassembly at the main-drive end of the crankcase of a single cylinder location from each of the cylinder banks of a twenty-cylinder V-type engine. Cylinder retainer locations are designated 26, 27, 28, 29, 30, 31 in FIG. 2. Reference number 30 is at the location of engine cylinder number ten on the right bank of the twenty cylinder crankcase being converted.

The cylinder retainers are symmetrically spaced from a longitudinal central portion of crankcase 20; such central portion is omitted in the partial views of FIGS. 1-4. During usage, each such cylinder retainer receives and retains an individual cylinder liner/power assembly.

Figure 6:
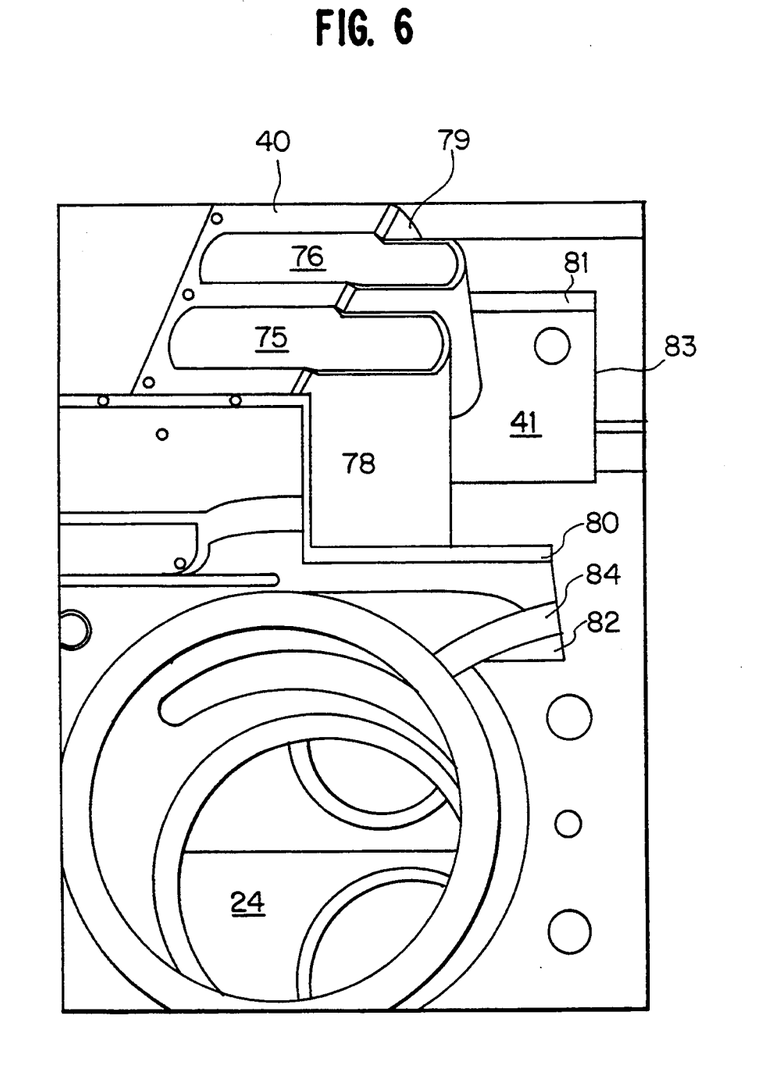
FIG. 6 is a perspective partial view of an upper portion of a crankcase for describing disassembly of exhaust deck and adjacent water jacket portions in accordance with the invention.

Oil return pipes 34, 36 from the twenty-cylinder crankcase (shown in FIGS. 3, 4) are relocated toward the longitudinal center at each bank. Procedures for processing the exhaust and power deck surfaces and distal edges of the crankcase framework, in accordance with crankcase conversion teachings of the invention, are also described in relation to FIGS. 5-11. Portions of crankcase exhaust deck 40, water jacket side walls 41 (as best seen in FIG. 6), crankcase peripheral side walls 42 (FIGS. 3,4) and internal air box support framing 43, 44 for cylinder retainers are severed (by carbon arc gauging or oxygen fuel flame cutting) and are part of disassembled portion 46 at the accessory-drive end of FIGS. 1, 3; or, similar structure as severed and forming part of the disassembled portion 50 at the main-drive end of FIGS. 2, 4.

Portions of each exhaust deck, water jacket side walls, internal air box framing members for cylinder retainers, crab-plate supports, and air box peripheral side walls, which are to be restored to become part of the converted sixteen-cylinder crankcase, are indicated by hatched lines in FIGS. 1 through 4.

In addition to returning water outlet 52 to exhaust deck 40 near the accessory-drive end of FIG. 1, aftercooler water discharge opening 54 is relocated to exhaust deck location 56 of FIG. 2 intermediate cylinder retainer locations for transverse pairs 26, 27 and 28, 29.

As part of the disassembly procedures of the invention, provision is made for severance of a portion of each endplate (58, FIG. 1 and 60, FIG. 2) at each longitudinal end of the twenty-cylinder crankcase. An upper portion 61 of each endplate is severed from the remainder of the endplate by cutting along interrupted line 64 of FIG. 5. Such endplate severing facilitates access for separating upper parts at 66, (FIGS. 1, 3) and 68 (FIGS. 2, 4) from major disassembled segments designated 46, 50, respectively, shown in FIGS. 1-4. And, also, facilitates separation of crab-plate supports 71, 72, 73, 74 and adjacent air box support framing, indicated at 43, 44 in FIGS. 3, 4, for next adjacent cylinder retainers 22, 23 and 28, 29, at each end of the sixteen-cylinder crankcase.

A half-round galley siphon plate (such as 70 in FIG. 5) is located at each longitudinal end of the water jacket. The upper portion of each endplate, such as 61 in FIG. 5 as severed along line 64, enables separation of each such severed endplate portion from such exhaust deck, water jacket, crab-plate support and air box framing portions.

Access for separation of the remainder of transversely-oriented endplates 58, 60 of the twenty-cylinder crankcase is facilitated by cutting and separating access windows shown in FIGS. 3, 4 on each side and each longitudinal end of the periphery of each air box. With access through the air box periphery windows, and around the water galley ends as described above, each twenty-cylinder endplate can be severed from remaining longitudinally-extending crankcase framing structure by transversely-directed cuts which help to diminish loss of crankcase length.

After endplate removal, longitudinal end crab-plate supports, such as 71, 72 (FIG. 1), 73, 74 (FIG. 2), are returned; and associated exhaust deck, water jacket, and internal framing support (such as 43, 44) portions (FIGS. 1, 2) are return welded into place to be unitary with remaining crankcase structure contiguous to cylinder retainers 24, 25 and cylinder retainers 28, 29, respectively. The perspective partial view of FIG. 6 shows where similar structure had earlier been associated with cylinder retainer 24; and shows cut lines of the adjacent exhaust deck and water jacket 41 side walls contiguous to exhaust openings 75, 76. Cut lines include jacket 78, 79, 80, 81, 82 and 83 and the adjacent internal air box framing cut line 84. Corresponding cut lines exist between cylinder retainers 28, 29 of FIG. 2. The exhaust deck, water jacket and cylinder framing portions shown hatched in FIGS. 1, 3 are returned and welded in-place about exhaust opening 75, 76 and cut lines 78–84 of FIG. 6. Crab-plate supports 73,74 and the associated hatched structures from the disassembled portion of FIGS. 2, 4 are returned with the cylinder framing portions and welded in-place in a similar manner between cylinder retainers 28, 29 of FIG. 2. Internal framework support members around each such cylinder retainer at the end of the sixteen-cylinder configuration complete the separation of all cylinder head retainers from the interior of the air box in each bank.

Rough cut edges remain at each longitudinal distal end of the remaining longitudinally-extending crankcase structure, which is endplate free. Machining of such distal edges is carried out as indicated by FIGS. 7, 8, and as described in more detail in copending and commonly assigned U.S. patent application, entitled *FABRICATING AND MACHINING PROCEDURES FOR CRANKCASES FOR LOCOMOTIVE DIESEL ENGINES,* Ser No. 08/165,336 filed concurrently herewith and included herein by reference.

Figure 7:
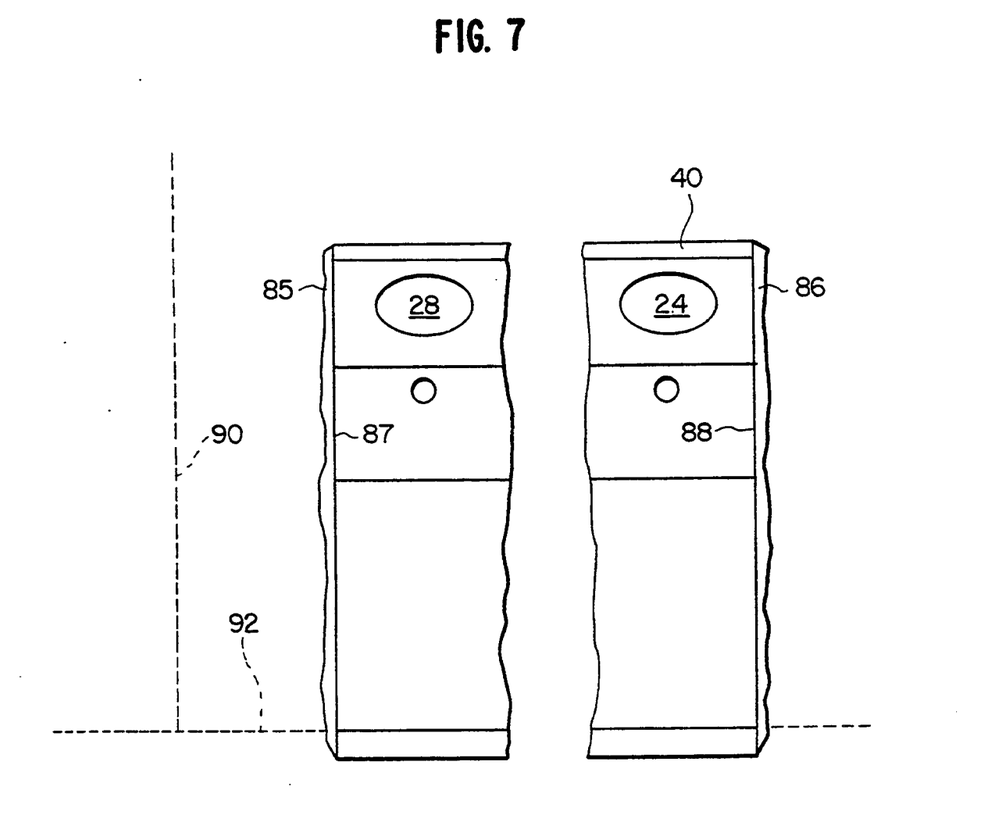
FIG. 7 is a schematic partial side view of a crankcase for describing distal edge machining contributions of the invention.
Figure 8:
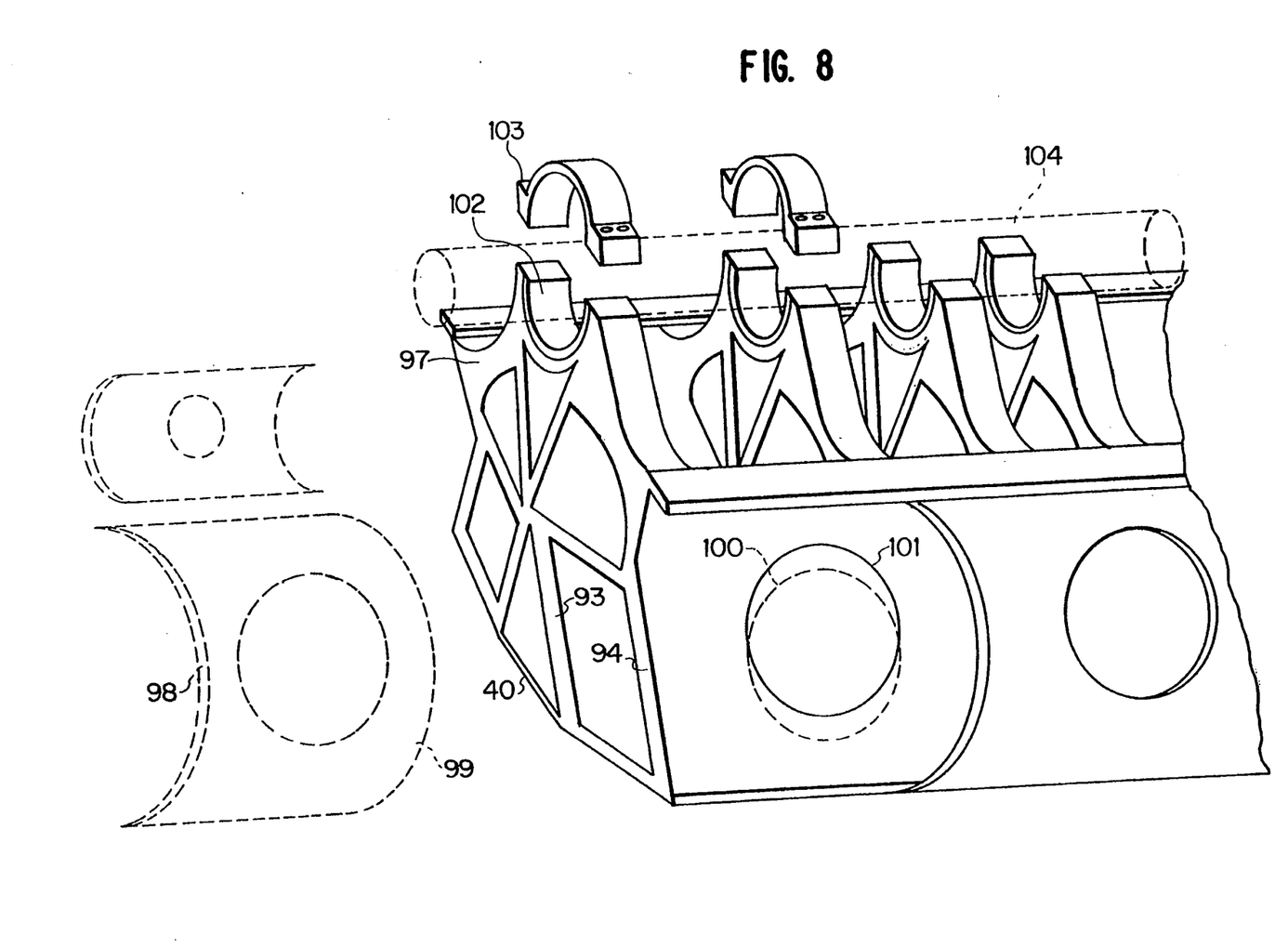
FIG. 8 is a perspective partial view of an inverted crankcase, free of endplates, with replaceable access window disassembled, and with separated exhaust deck and water discharge manifold portions replaced, for describing interior access and crankcase shaft bearing preparation contributions of the invention.

Referring to FIGS. 7, 8, such rough-cut distal end cut edges as indicated at 85, 86, are machined to present smooth distal edges 87, 88. Transversely-directed vertical reference plane 90 is perpendicularly transverse to centrally-located horizontal reference axis 92. Distal edges are machined to present a planar surface which is substantially parallel to transverse reference plane 90, or is within predetermined tolerance limits of about one-half to one degree in either or both the transverse and vertical directions, for purposes of mounting a new planar endplate.

Rough cut edges 85, 86 (which are parallel to reference plane 90) include the distal edges of exhaust deck 40, and the distal edges of internal air box structure members, such as 93, 94, and main "A" frame surface 97 of FIG. 8. Edges, such as 98 of each periphery air box window such as 99, which are to be returned and welded into place are machined, but air box windows are not returned. Centrally located portions of the endplate are made unitary with the longitudinally-directed structural framework of the crankcase. FIG. 8 with air box window 99 disassembled shows interior air box wall openings, such as 100, 101, which provide air to cylinder inlets at a level below the earlier described upper air box wall (such as portions 43, 44) which surround and support cylinder head retainer portions. Openings 100, 101 help to provide access to interior portions of the endplate. The "A" frame bearing surfaces, such as 102 of FIG. 8, and crankshaft bearing caps, such as 103, provide support for the crankshaft 104.

Figure 9:
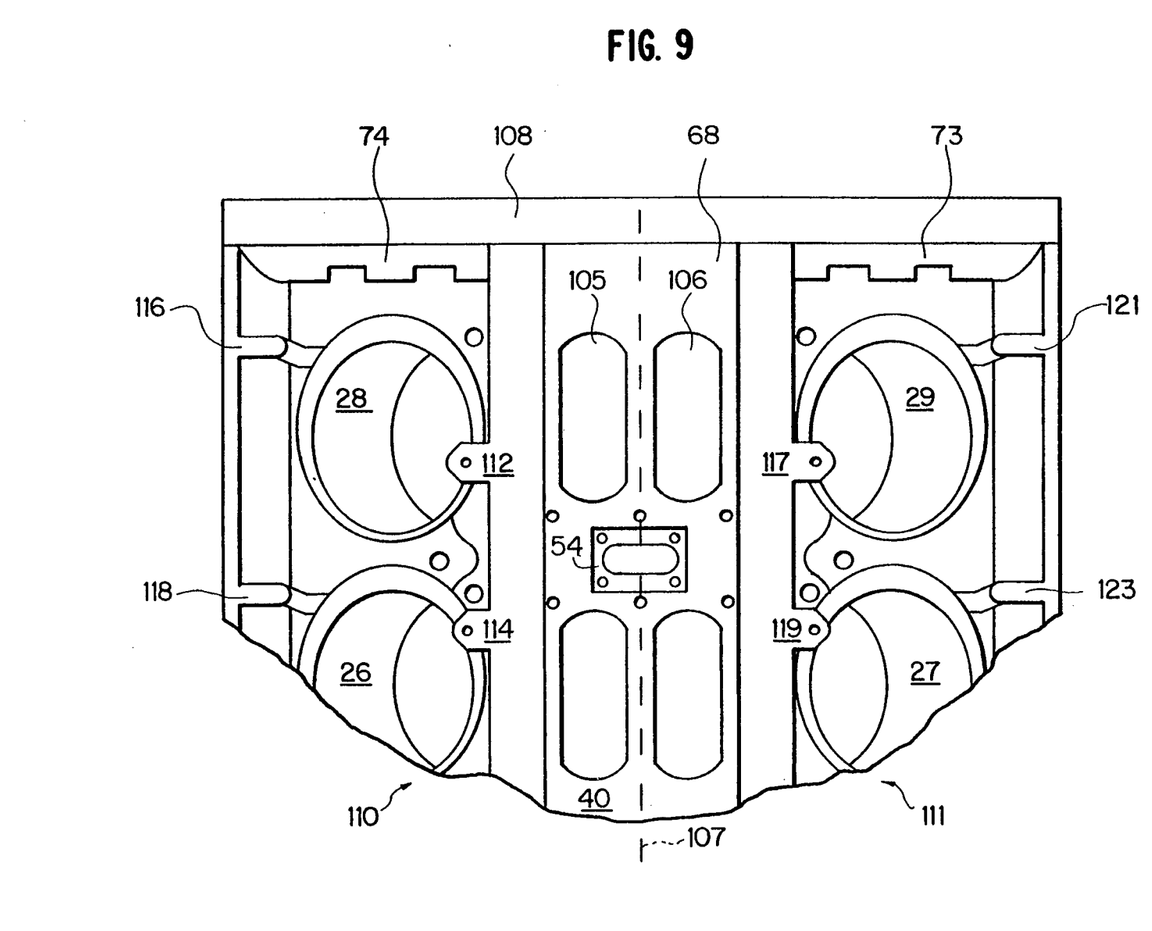
FIG. 9 is a top plan partial view of an upper portion of a crankcase for describing exhaust and power deck processing steps of the invention.

In the top plan partial view at the main-drive end of the converted sixteen-cylinder crankcase of FIG. 9, exhaust deck and associated water jacket portions have been welded in-place about exhaust openings 105, 106; aftercooler discharge opening 54 is relocated and welded in place in exhaust deck 40, and internal air support framing around cylinder retainers 28, 29 is welded in-place. Interrupted line 107 represents the vertical centerline reference plane for the crankcase; and new preselected thickness gage endplate 108 is in place.

Support surfaces for camshaft towers are machined to define a single planar power deck surface for each cylinder bank (110, 111 of FIG. 9). Individual support surfaces of each bank as machined can include crab-plate support surfaces, such as 74, camshaft tower support surface 112, 114, and fuel-injector support surfaces such as 116, 118. Individual camshaft support tower surfaces are machined along the full longitudinal length of each cylinder bank; and other support surfaces are machined to augment each power deck surface for receipt and support of drive-related components.

Corresponding individual support surfaces 73, 117, 119, 121 and 123 are machined in cylinder bank 111 (FIG. 9). The machining of the power deck surface for each cylinder bank is coordinated with exhaust deck machining and is uniform for each power deck; in accordance with teachings of the invention, power deck machining should limit downward displacement of each such power deck to not substantially more than thirty-five; and, preferably, should be less than about thirty mils. That is, each planar deck support surface is machined to achieve a single planar power deck surface for each bank of the converted sixteen-cylinder bank which is preferably not displaced substantially greater than thirty mils from the corresponding power deck surface for the twenty-cylinder crankcase.

However, the power deck displacement for each cylinder bank 110, 111, due to such machining, is uniform. That is, each newly machined planar power deck surface, if extended laterally inwardly, would intersect the centrally-located reference plane 107 along the same horizontal line, and would form the same included angle (sixty seven and one-half degrees) with that reference plane. The amount of machining to achieve a smooth planar exhaust deck surface for receipt of gaskets is about the same as that for the power deck surfaces; that is, preferably not substantially greater than about thirty mils while maintaining exhaust deck thickness in the range of about five eighths to seven eighths of an inch.

In accordance with teachings of the invention, the uniform displacement of the power deck surface determines the vertical displacement of the camshaft for each cylinder bank, and the vertical displacement of the engine crankshaft. Stated otherwise, relocation of each camshaft is responsive to the displacement of the power deck surface.

The upper surfaces of the cylinder head retainer means are at a lower level than the power deck surfaces, and are machined smooth for receiving the seal and each cylinder head.

Figure 10:
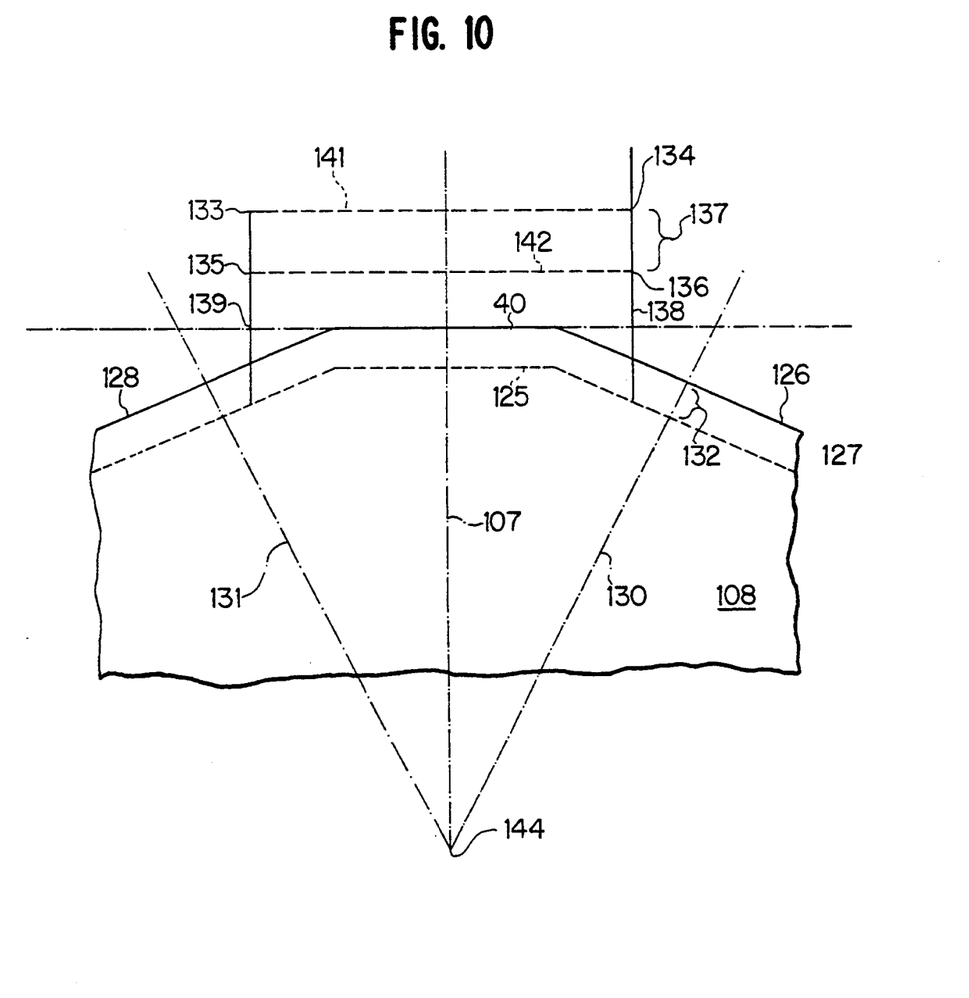
FIG. 10 is a schematic partial end view of a crankcase for describing dimensional and angular relationships during relocation of camshafts and crankshaft of the invention.

Camshaft and crankshaft relocation principles are further described in relation to FIG. 10. Original exhaust deck 40 is displaced by machining a new level indicated by 125. Machining of original power deck surface 126 relocates the new power deck surface at 127; and machining of original power deck surface 128 displaces that surface to level 129. The uniform machining displacement of each power deck surface is measured along each cylinder axis (130, 131). For example, the amount of displacement along the central axis 130, for cylinders located in that cylinder bank, is indicated at 132.

The camshaft axes (133, 134) for each bank are relocated to new camshaft axes locations, 135, 136, respectively. The vertical camshaft displacement is determined trigonometrically based on the value of displacement 132 and an included angle, such as the twenty-two and one-half degree included angle formed by each cylinder axis, with the central reference plane 107, for the forty-five degree V-orientation of the cylinder banks. For example, a displacement 132 of thirty mils relocates camshaft axis downwardly by the amount (designated as 137) equal to about thirty-two and five tenths mils. A machined displacement of twenty mils results in a vertically downward displacement (137) of the camshaft axis of about twenty-two mils.

The camshaft axis for each cylinder bank is moved along its respective vertical plane 138, 139 and the horizontal plane (141) located between the original camshaft axes remains uniformly spaced when relocated between the new camshaft axes, indicated at 142. That is, the horizontal distance (as represented by line 14i) between the original camshaft axes is identical to the horizontal distance (as represented by line 142) between the new camshaft axes as located after downward displacement.

The new crankshaft axis (144, FIG. 10) is located at the intersection of cylinder axes 130, 131, and is displaced downwardly from the original crankshaft location by the same amount as the vertically downward displacement of a camshaft axis.

Figure 11:
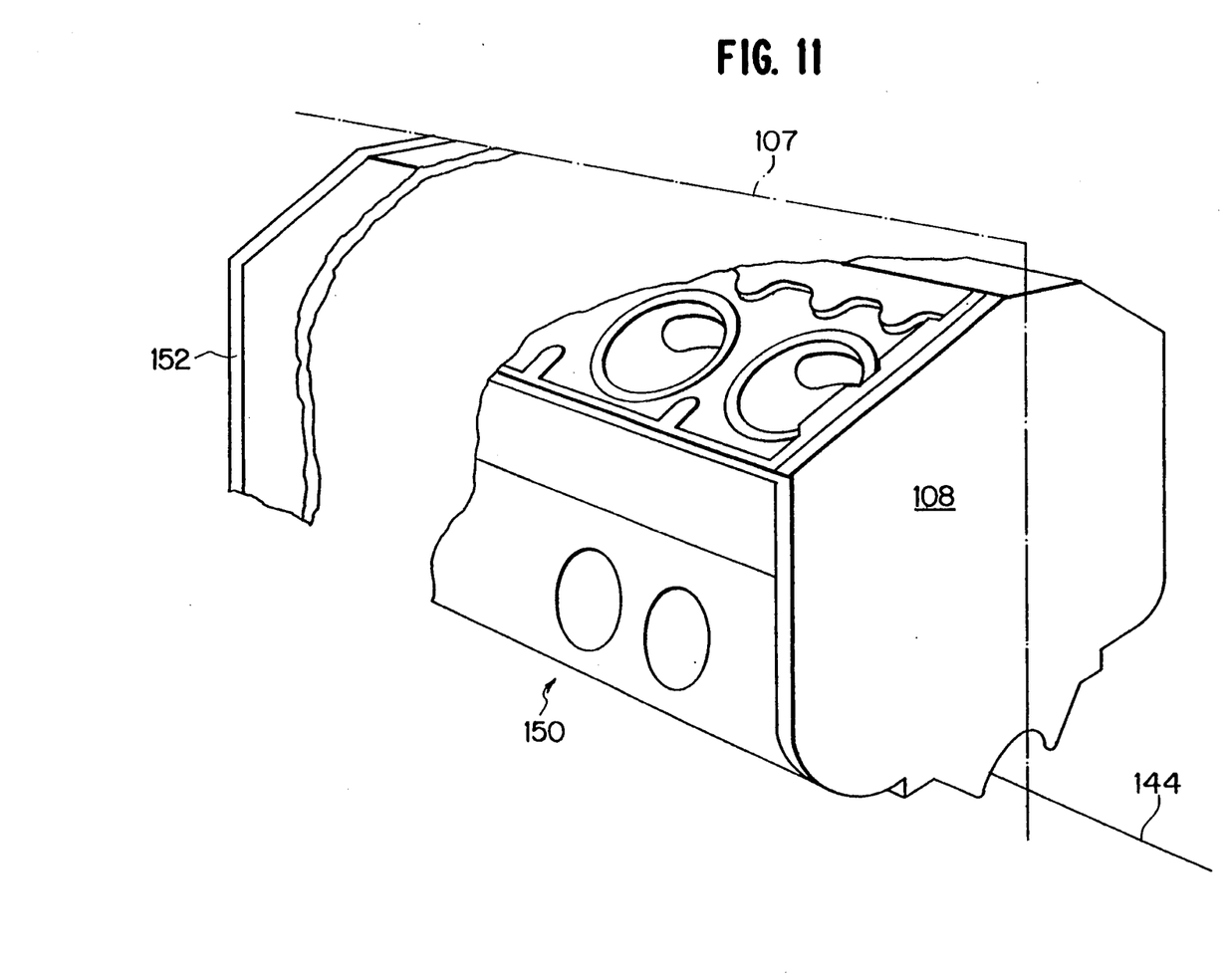
FIG. 11 is a perspective view, with portions cut away, of a converted sixteen-cylinder two-cycle V-type engine crankcase as reassembled, prior to preparing openings in the new increased-thickness gage endplates, for describing longitudinal alignment contributions of the invention.

FIG. 11 shows the converted crankcase 150 with portions cut away showing structured relationship of reassembled portions at one longitudinal end of a cylinder bank. Prior to in-place welding of the access windows (shown disassembled in FIG. 8) a vibration stress-relief is applied to each weld and its contiguous area. Such vibration stress-relief is carried out at or near an ultrasonic frequency to relieve internal stress resulting from cooling of the weld. After vibration stress-relief of internal framework members, each side air box access window is welded in place; and vibration stress-relief applied to such window welds.

In FIG. 11, endplates 108, 152 are in place, as well as replaced access windows throughout each air box; that is, the converted crankcase 150 is in a status at which thermal stress-relief of the entire crankcase is applied. Such thermal stress-relief is carried out by gradual heating of the crankcase with furnace heating to about 1100° F. to 1200° F. holding that temperature about four hours, and then furnace cooling over about a six hour period.

The new endplates 108, 152 are between about one inch and about one and one-quarter inches in thickness, which compensates for machining of distal cut edges of the framework, as previously described, and can be used compensating for any slight camber along the length of the converted crankcase. In addition, such increased thickness endplates permit machining of each endplate external surface so as to be parallel to transverse reference plane 90. Such external endplate surface machining is carried out after stress-relief of the crankcase and before preparing openings for endplate support of gearing as shown in FIGS. 12 and 13.

With external endplate surfaces machined "square"; that is, parallel to transverse plane 90, openings are made in each endplate for support of such components as camshaft brackets, stub shaft brackets, and the like. The predetermined relocation of the camshafts and crankshaft, as described in relation to FIG. 10, is a significant factor and contribution for purposes of locating such openings to be drilled or tapped in each endplate.

That is, as a result of triangulation method taught, the relationship between the camshafts, and between each camshaft and the crankshaft, remains constant. In that way, angular and dimensional relationships of each such endplate support opening to the camshafts and crankshaft locations remain the same. By thus fixing such relationships, standard motive-power components for a sixteen-cylinder engine (of the series being converted, such as the 645) can be used throughout the converted and refabricated sixteen-cylinder crankcase.

Figure 12:
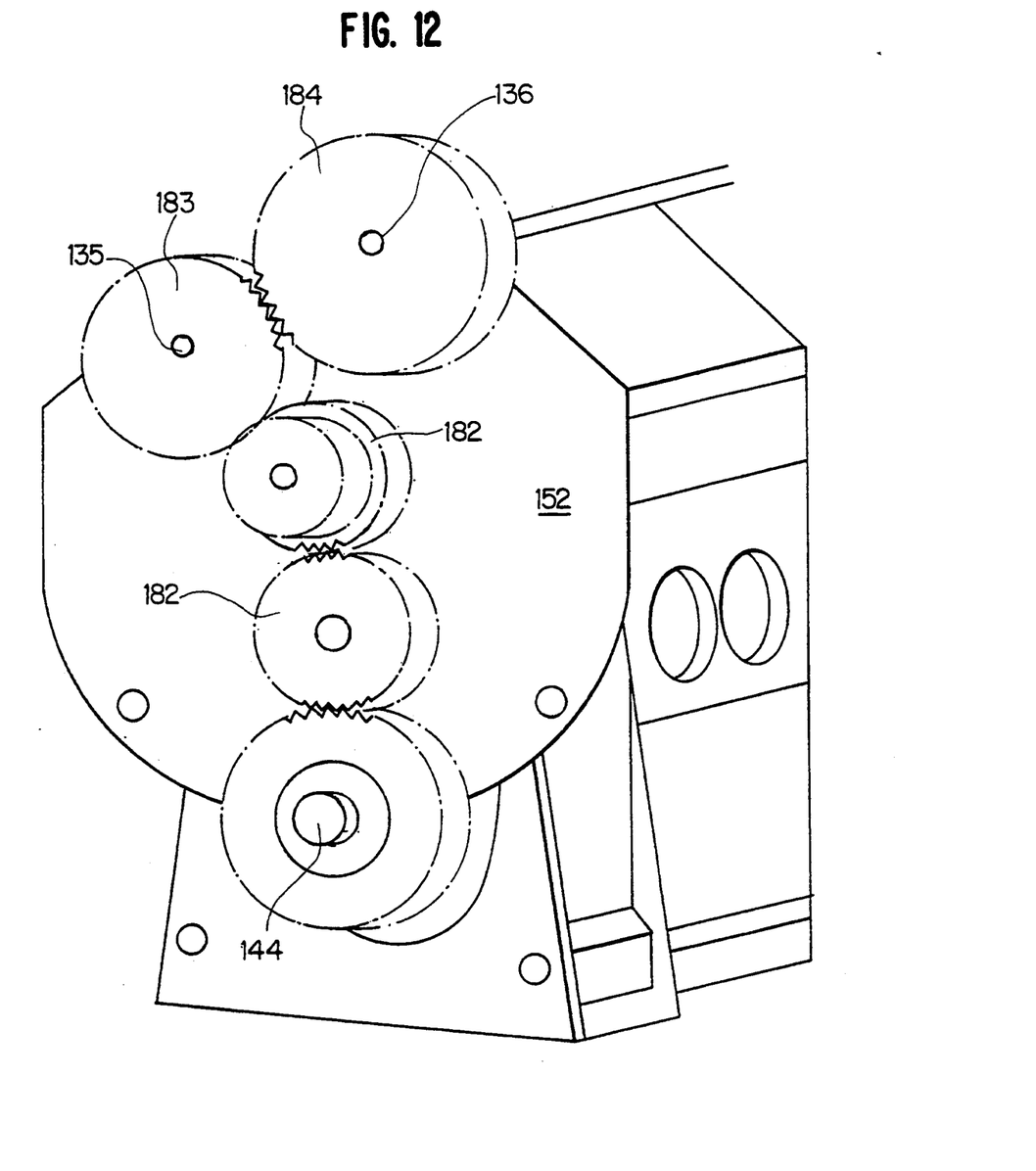
FIG. 12 is a schematic perspective view of the main drive end of a converted crankcase for describing endplate processing.
Figure 13:
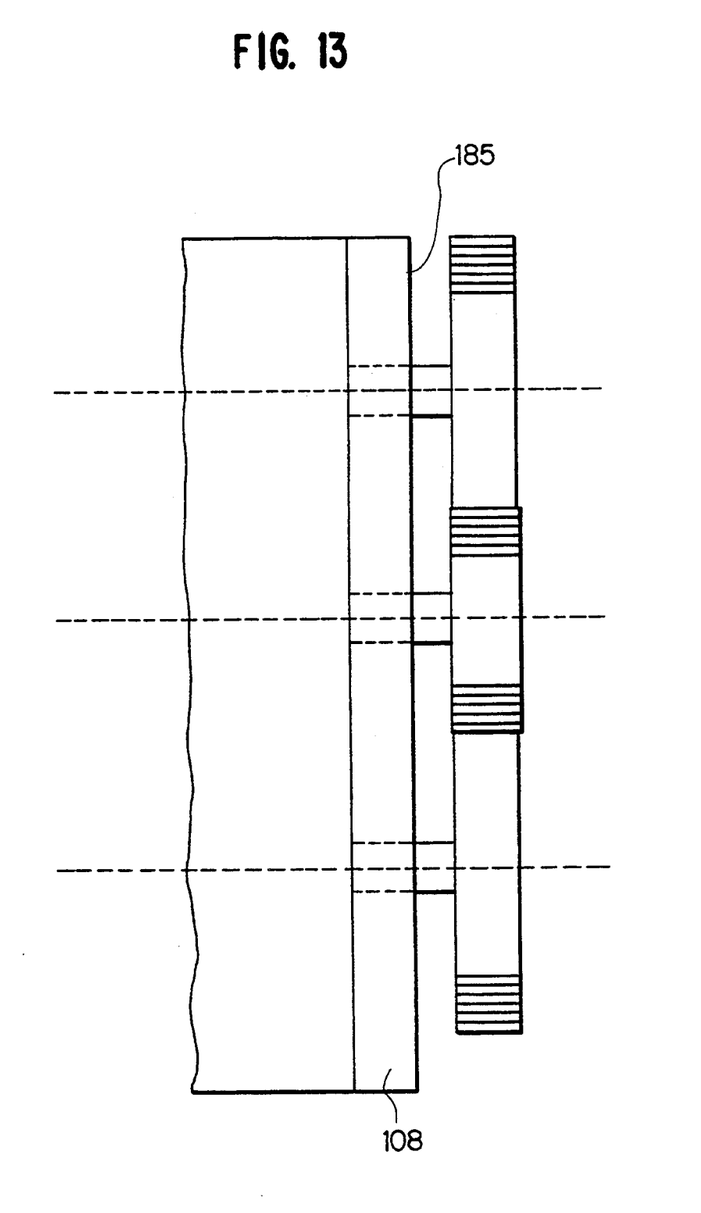
FIG. 13 is a schematic side view, partially in section, of a portion of the accessory-drive end of a converted crankcase for describing endplate machining and drive-gear alignment contributions of the invention.

FIGS. 11, 12 show the new crankshaft location 144. FIG. 12 schematically shows respective camshaft axis locations 135, 136. Camshaft axis locations are equally spaced vertically above each power deck and horizontally from the central reference plane as described earlier in relation to FIG. 10. Only one camshaft (135) is driven by drive gears 180, 182 located between the crankshaft gear and camshaft gear 183; the latter camshaft gear drives camshaft gear 184. The machined external surface of the endplate is parallel to the plane of rotation of the drive gears.

In FIG. 13, the external (squared) surface 185 of endplate 108 is parallel to the plane of rotation for each gear. Such features, as well as meeting overall tolerance limits on crankcase lengths, are met by machining the new increased thickness endplates.

While specific materials, parts, dimensions and sizes have been set forth for purposes of describing principles of the invention, it should be recognized that certain changes or substitutions can be made in light of the above teachings without departing from those principles. Therefore, reference should be made to the appended claims for purposes of evaluating the scope of the present invention.

We claim:

1. Method for converting a crankcase for a two-cycle V-type diesel electric locomotive engine from a twenty-cylinder configuration to sixteen with in-place fabricating/machining of preselected thickness gage endplates and predetermining relocations for camshafts and crankshaft to enable operational orientation and support of standard drive components, comprising the steps of:

A. removing all motive-associated components including camshaft support brackets, camshaft towers and camshafts, crankshaft retainer caps and crankshaft, engine-mounted drive gears and support brackets, fluid pumping means and support hold-down means, power assemblies, cylinder test valves, and cylinder liners from a twenty-cylinder two-cycle V-type engine block to present an elongated twenty-cylinder crankcase, including:

(i) a pair of V-oriented cylinder banks, each bank extending longitudinally along its respective left and right side of the elongated crankcase, (ii) peripheral side wall means defining
  (a) an upper test-valve side wall, located above
  (b) an air box peripheral side wall on each respective side of the crankcase, each such air box peripheral side wall including:
    ten peripheral handhole openings distributed longitudinally along its respective side in the same symmetrical and spaced relationship to the longitudinal center of the crankcase as the cylinder head retainers, (iii) structural framework extending longitudinally of the crankcase for supporting the pair of V-oriented cylinder banks, such framework defining
  (a) an enclosed water discharge manifold disposed to extend longitudinally of the crankcase between the V-oriented banks at the open end of such V-configuration;
    such manifold being defined by an exhaust deck presenting a horizontally-oriented upper surface for the crankcase, and by a longitudinally-extending water jacket side wall converging downwardly from each lateral side of the exhaust deck,
  (b) cylinder locating structure with ten individual cylinder retainers being distributed symmetrically and uniformly along each bank in relation to such longitudinal center of the crankcase, each for receipt of a cylinder liner/power assembly,
  (c) a power deck surface disposed along each such V-oriented bank contiguous to, and in angled relationship to, such exhaust deck; each such power deck surface being defined by:
    a plurality of individually separate camshaft bearing support means,
    a plurality of individually separate support surfaces for crab-plate means for retaining such cylinder liner/power assemblies, and
    a plurality of individual support surfaces distributed along peripheral lateral sides of each such power deck for supporting bearing blocks for a fuel-injector control shaft for each bank,
    such individual camshaft bearing support means being unitary with, and extending in angled relationship from, the exhaust deck along each lateral side of such exhaust deck,
  (d) longitudinally-extending framework members, internally of such crankcase upper surface and side walls, for supporting such water manifold means and cylinder retainers, and
  (e) an exhaust passage from each such cylinder retainer extending through such water manifold and defining an individual exhaust opening in such exhaust deck for each such cylinder,
    such cylinder exhaust openings being distributed longitudinally along such exhaust deck in the same symmetrical and uniformly spaced relationship as such cylinder retainers from such longitudinally central portion of the crankcase;

(iv) a transversely-oriented endplate having a thickness gage of about three-quarters inch disposed at, and unitary with, such twenty-cylinder crankcase side wall means and structural framework members at each longitudinal end of the elongated crankcase;

B. establishing, for reference purposes:
  (i) a centrally-located horizontal reference axis extending between longitudinal ends of the elongated crankcase,
  (ii) a longitudinally-oriented vertical centerline plane of reference which includes such centrally-located axis,
  (iii) a transversely-oriented vertical plane of reference which is perpendicularly transverse to such centrally-located horizontal axis, and
  (iv) a preselected length within specified tolerance limits for a sixteen-cylinder crankcase as converted from the twenty-cylinder crankcase;

C. cutting portions of the air box peripheral side wall to enable removal of air box peripheral side wall access windows corresponding to two cylinder locations for each bank at each longitudinal end of the twenty-cylinder crankcase;

D. disassembling a portion of the twenty-cylinder crankcase at each of its longitudinal ends which removes cylinder locating structure from each bank at each end of such twenty-cylinder crankcase, such disassembling removing a pair of cylinder retainers from each end of the crankcase, along with exhaust deck and water jacket portions, intermediate such longitudinal end cylinder retainers and the next adjacent pair of cylinder retainers of each such longitudinal end, by:
  (i) cutting the exhaust deck and water jacket side wall portions of the water manifold contiguous to such second pair of cylinder retainers at each such longitudinal end, and test-valve side wall means for such pair of cylinder retainers being removed from each such longitudinal end of the elongated crankcase; with
  such cutting of the exhaust deck and water manifold side walls taking place without disturbing exhaust passages which extend through such water manifold for such second pair of cylinders, and
  (ii) transversely cutting remaining internal structural framework members for completion of severance of the pair of cylinder retainers at each longitudinal end of the elongated crankcase;

E. selecting portions of the exhaust deck, water manifold side walls, crab-plate support surfaces and adjacent portions of the upper air box section for a surrounding cylinder head retainer means from disassembled portions at each longitudinal end of the twenty-cylinder crankcase;

F. restoring selected portions to the remaining crankcase framework while discarding such end pair of cylinder retainers as disassembled at each longitudinal end of the twenty-cylinder crankcase, such selected portions returned to the remaining crankcase structure comprising an aftercooler return inlet and water discharge outlet newly placed in the exhaust deck, crab-plate support surfaces for each bank at each longitudinal end of the remaining crankcase structure, and exhaust deck and water manifold portions to complete eight cylinder locations in each bank of remaining crankcase structure;

G. machining cut framework edges at each longitudinal distal end of such remaining framework so as to define a substantially planar surface for receipt of a planar endplate at each such distal end, such machined surfaces being oriented in parallel relation to, or within predetermined vertical and transverse tolerance limits with respect to, the transversely-oriented vertical reference plane;

H. machining the upper surface of the exhaust deck to provide a substantially planar surface defining exhaust openings for the eight cylinder locations in each bank and aftercooler discharge opening, and a water outlet for a sixteen-cylinder crankcase;

I. preparing a single planar power deck surface along each bank by machining individual support surfaces for camshaft towers, for crab-plate retaining means, and bearing blocks for a fuel injection control shaft along each bank of the sixteen-cylinder crankcase, with machining of each power deck surface being coordinated within predetermined machining tolerance specifications to locate the single planar power deck surface for each bank such that, if extended laterally inwardly, each planar surface would intersect such centrally-located longitudinally-extending reference plane at the same location and define the same included angle of substantially sixty-seven and one-half degrees with such reference plane for each bank;

J. providing a new planar endplate of predetermined thickness gage for each distal end of such structural framework, such preselected thickness gage for each new endplate being in a range extending from one inch to about one and one quarter inches;

welding each such new planar endplate to the machined framework edges which define a single planar surface at each respective end of the remaining framework for the sixteen-cylinder crankcase, each such new endplate being welded at each such longitudinal distal end to be oriented within tolerance specifications as established by the substantially planar orientation of such machined framework edges at each such respective longitudinal distal end, such tolerance specifications orienting each new endplate so as to be within about a half degree to about one degree, in either or both vertical and transverse relationship, with respect to such transversely-oriented vertical plane of reference;

L. welding in-place a single handhole distal end portion of the air box peripheral side wall as removed from a cylinder location of each bank at each longitudinal end of the twenty-cylinder crankcase to complete the peripheral side wall means for each bank for the converted sixteen-cylinder crankcase;

M. establishing a camshaft axis location for each camshaft with respect to, and along, each such power deck, each such camshaft axis location for a bank being in a vertical plane which is parallel to, and predeterminedly equally spaced horizontally from, such centrally-located reference plane to establish a new vertical location for the camshaft axis of each bank of the sixteen-cylinder converted crankcase, each such new camshaft axis location for each bank being in the same vertical plane as the original camshaft axis with the amount of downwardly displaced movement from original crankshaft location for each bank being determined trigonometrically, responsive to the uniform machining of each such power deck surface; and N. establishing a new location for mounting a crankshaft for the converted sixteen-cylinder crankcase with the crankshaft axis being located in the longitudinally-oriented vertical centerline reference plane, and being displaced vertically downwardly, for the converted sixteen-cylinder crankcase, an amount equal to vertically downward displacement of each such new camshaft axis location.

2. The method of claim 1, further including applying a vibration stress-relief treatment to such welds, and contiguous weld areas, for returning portions of the exhaust deck and water manifold side walls, and for the new endplate at each such longitudinal end prior to welding such side wall periphery access window in-place.

3. The method of claim 2, further including applying a vibration stress-relief treatment to such air box peripheral access window welds and contiguous areas, 4. The method of claim 1 or 2, further including applying a thermal stress-relief heat treatment to the converted sixteen-cylinder crankcase, with new endplates and access window portions welded in-place, to relieve work stress throughout such converted crankcase.

5. The method of claim 4, further including vibration stress-relief of accessible welds and contiguous areas following such thermal heat treatment.

6. The method of claim 4, further comprising the steps of:

fabricating such new endplate as welded in-place to be unitary with remaining crankcase structure at each such longitudinal end of the converted sixteen-cylinder crankcase, including machining the exterior transverse surface of each such new preselected thickness gage endplate so as to present a transverse plane in parallel relationship to such transversely-oriented vertical plane of reference at each such end of the sixteen-cylinder crankcase, and in which such machining is carried out so as to maintain a longitudinal dimension between such machined surfaces which is within prescribed tolerance limits for a sixteen-cylinder crankcase.

7. The method of claim 6, including preparing openings for engine-supported drive gear and associated assemblies, pump means, or bracket means of each respective new endplate, each such opening being symmetrical with respect to its centerline axis, with each such centerline axis being oriented to be parallel to the longitudinally-oriented vertical centerline plane of reference and to be perpendicularly-transverse to the transversely-oriented vertical plane of reference.

8. The method of claim 1, further including welding bearing metal into main "A" frame bearing surfaces of the crankcase, adjusting the length of removed crankshaft retainer cap legs so as to enable providing for a coaxial relationship with replacement crankshaft segments, mounting such retainer caps in-place on such main bearing "A" frames, and line-boring crankshaft bearing surfaces so as to provide for retaining replacement crankshaft segments with the central longitudinal axis of such replacement crankshaft extending in such longitudinally-oriented vertical centerline reference plane, with such central axis locations for replacement crankshaft and camshaft segments enabling mounting of dimensionally and operationally standard power assemblies for a sixteen-cylinder engine along each bank of the replacement crankcase.

9. The method of claim 7, in which
the dimension between, and angular relationship of, the centerline axis of the crankshaft and each camshaft centerline axis are unchanged by their respective relocations, such that
openings for endplate-mounted supports, such as camshaft and stub shaft brackets of the converted sixteen-cylinder crankcase, are prepared by maintaining the same dimensional and angular relationships to crankshaft and camshafts as prior locations relative to crankshaft or camshaft locations for such twenty-cylinder crankcase.

* * * * *